United States Patent [19]

Brown et al.

[11] 4,073,685
[45] Feb. 14, 1978

[54] REACTOR CORE LATERAL RESTRAINT ASSEMBLY

[75] Inventors: Stanley J. Brown; Wilhelm Gorholt, both of San Diego, Calif.

[73] Assignee: General Atomic Company, San Diego, Calif.

[21] Appl. No.: 659,597

[22] Filed: Feb. 20, 1976

[51] Int. Cl.$^2$ ............................................. G21C 13/04
[52] U.S. Cl. ........................................ 176/87; 176/85; 248/358 AA
[58] Field of Search ............................ 176/40, 85, 87; 280/106.5 R; 248/358 AA; 267/88

[56] References Cited

U.S. PATENT DOCUMENTS

| | | | |
|---|---|---|---|
| 2,518,733 | 8/1950 | Walker | 280/106.5 R X |
| 2,520,442 | 8/1950 | Schwartz | 248/358 AA |
| 2,631,841 | 3/1953 | Tillou et al. | 248/358 AA X |
| 2,775,445 | 12/1956 | Goodloe | 248/358 AA |
| 3,624,846 | 12/1971 | Rub | 267/88 X |
| 3,784,219 | 1/1974 | van der Burgt et al. | 280/106.5 R X |
| 3,900,367 | 8/1975 | Class | 176/87 |
| 3,964,969 | 6/1976 | Brynsvold et al. | 176/40 X |

FOREIGN PATENT DOCUMENTS

| | | | |
|---|---|---|---|
| 865,286 | 4/1961 | United Kingdom | 176/85 |
| 1,396,499 | 6/1975 | United Kingdom | 176/85 |

*Primary Examiner*—Peter A. Nelson
*Attorney, Agent, or Firm*—Fitch, Even, Tabin & Luedeka

[57] ABSTRACT

A spring pack for supporting a sprung mass relative to an unsprung mass includes a relatively low-rate spring unit and a relatively high-rate spring unit interconnected with each other and arranged between the sprung and unsprung masses, the relatively low-rate spring unit tending to respond to initial limited movement between the sprung and unsprung masses, a mechanical stop limiting the spring response of the relatively low-rate spring unit with relative movement beyond that limit tending to be absorbed by the relatively high-rate spring unit. A plurality of the spring packs are employed in a lateral restraint assembly for laterally supporting a reactor core relative to a vessel within a nuclear reactor, the relatively low-rate spring units absorbing initial multi-axial movement between the core and vessel with excessive movement of the core being absorbed by the relatively high-rate spring units.

9 Claims, 5 Drawing Figures

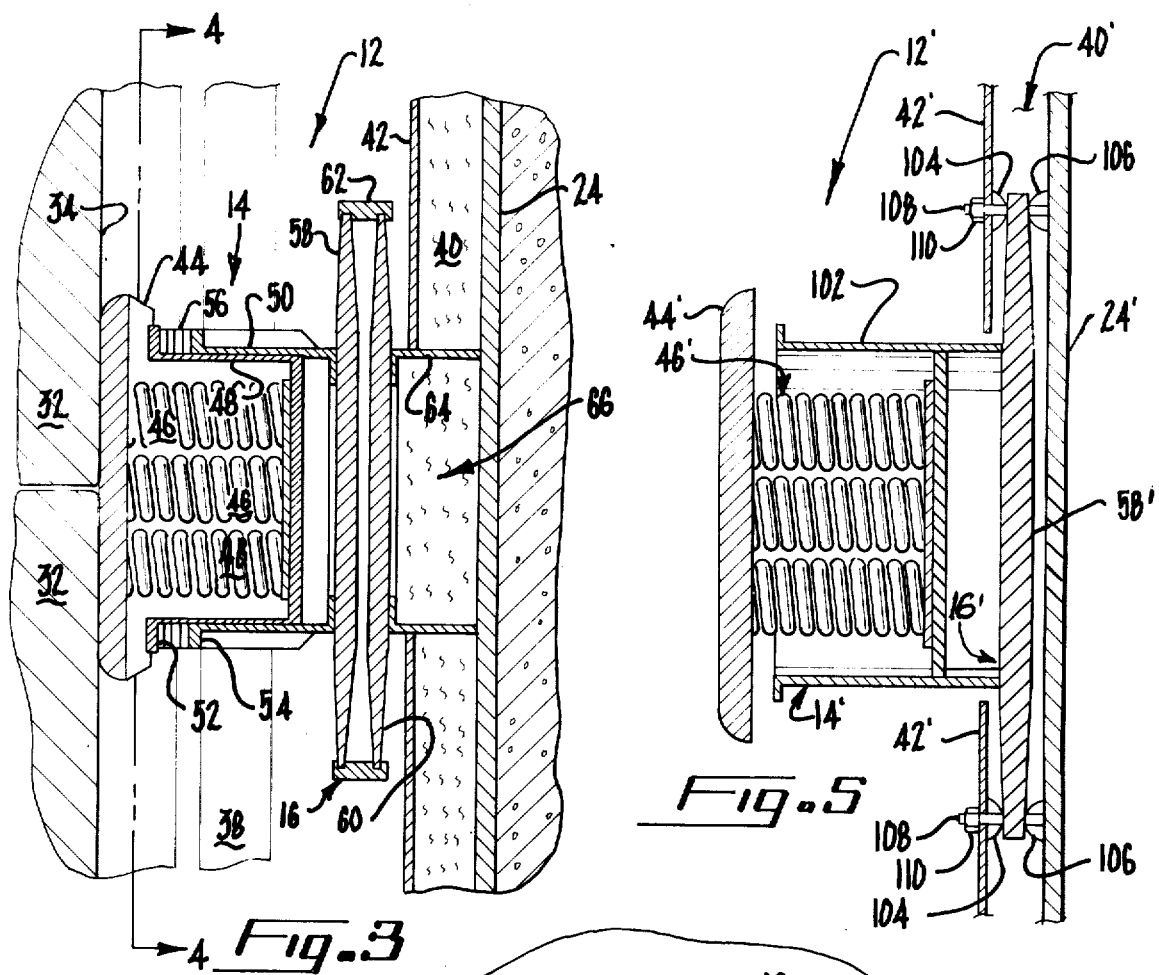
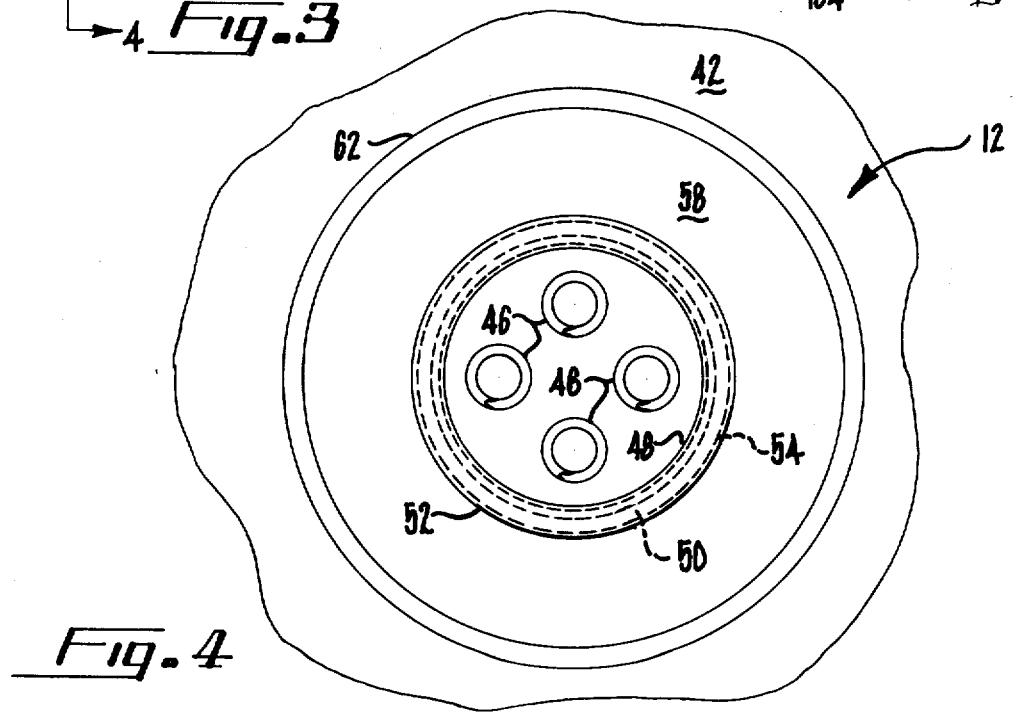

REACTOR CORE LATERAL RESTRAINT ASSEMBLY

The present invention relates to a spring pack suitable for supporting a sprung mass relative to an unsprung mass while providing a dual rate of spring response. The invention more particularly relates to a nuclear reactor of a type including a reactor core laterally supported relative to a reactor vessel by means of a plurality of such spring packs.

A nuclear reactor, for example, of the high temperature, gas cooled type, commonly includes a reactor core of relatively complex construction supported within a shell or vessel providing a shielded cavity for containing the reactor core.

Such a reactor core may be assembled from a large number of graphite blocks of different sizes and shapes arranged together in columns. The blocks within each column may be secured together to provide relatively loose lateral support therebetween. Due to the effects of thermal expansion and contraction, irradiation shrinkage, pressure effects and shrinkage or creep tendencies of the reactor vessel, it is not feasible to clamp the core assembly of columns into a rigid cylindrical structure. In addition, operation of the nuclear reactor requires that reactivity control elements be capable of insertion into the core at all times.

It has been known to mount such a loosely assembled core unit in spaced apart, floating relation within a surrounding vessel by means of a plurality of springs arranged between the lateral surfaces of the core unit and the reactor vessel. However, the design and assembly of such reactor core mountings has been complicated by space restrictions within the reactor vessel as well as the need to prevent failure or disarrangement of the core due to relative movement within the core units or due to movement of the entire core unit relative to the reactor vessel. More specifically, it is necessary to selectively limit displacement or movement of the core from a nominal position within the reactor vessel. In addition, it is also necessary to prevent the development of load reactions which might cause structural failure, particularly of the graphite components within the core assembly.

In order to meet these requirements, the entire core assembly must be capable of deflection or movement generally along three perpendicular axes or planes. For example, it is necessary to permit movement of the core assembly both radially and tangentially or angularly as well as allowing some vertical movement of the core assembly while providing a resilient force tending to maintain or return the core to a nominal position within the vessel.

As indicated above, such initial or limited movement of the core relative to the vessel tending to result in multi-axial movement therebetween is generally limited in intensity. However, a suitable restraint assembly must also resist or cushion relative movement between the core and the vessel due to forces of substantially greater magnitude. Such high intensity movement may tend to originate, for example, by seismic disturbances or other causes having very high energy levels. Because of the limited space available within the reactor vessel, it has heretofore been difficult to provide means for resisting or absorbing such high energy effects as well as low energy, multi-directional motion.

Within a nuclear reactor of the type described above, the core may be considered as a sprung mass with the reactor vessel being a relatively unsprung mass. It is further contemplated that other applications may include a sprung mass and an unsprung mass subject to relative movement of widely varying magnitude, thereby providing a similar requirement for a spring pack of the type provided by the present invention.

Accordingly, it is an object of the present invention to provide a dual-rate spring pack suitable for overcoming problems of the type summarized above.

It is a further object of the invention to provide such a spring pack including a relatively low-rate spring means and a relatively high-rate spring means which are interconnected with each other and arranged between a sprung mass and an unsprung mass, the low-rate spring means tending to absorb or resist initial limited movement between the sprung and unsprung masses while excessive movement therebetween tends to be absorbed or resisted by the high-rate spring means.

It is still a further object of the invention to provide such a spring pack including mechanical stop means for limiting the response of the low-rate spring means so that relative movement in excess of the spring response limit established for the relatively low-rate spring means tends to be absorbed or resisted by the relatively high-rate spring means alone.

It is yet another object of the invention to provide a nuclear reactor having a reactor core mounted within a reactor vessel and including a plurality of such spring packs arranged between lateral surfaces of the reactor core and the vessel in order to provide a shock absorbing cushion therebetween for absorbing or resisting relative movement of widely varying intensity.

Still other objects and advantages of the present invention are made apparent in the following description having reference to the accompanying drawings.

FIG. 3 is a sectioned view of a spring pack constructed according to the present invention, a plurality of such spring packs being contemplated for providing the lateral restraint assembly between the reactor core and reactor vessel of FIGS. 1 and 2.

FIG. 4 is a view taken along section lines 4—4 in FIG. 3.

FIG. 5 is a view similar to FIG. 3 while representing yet another embodiment of a spring pack according to the present invention.

Figure 1:
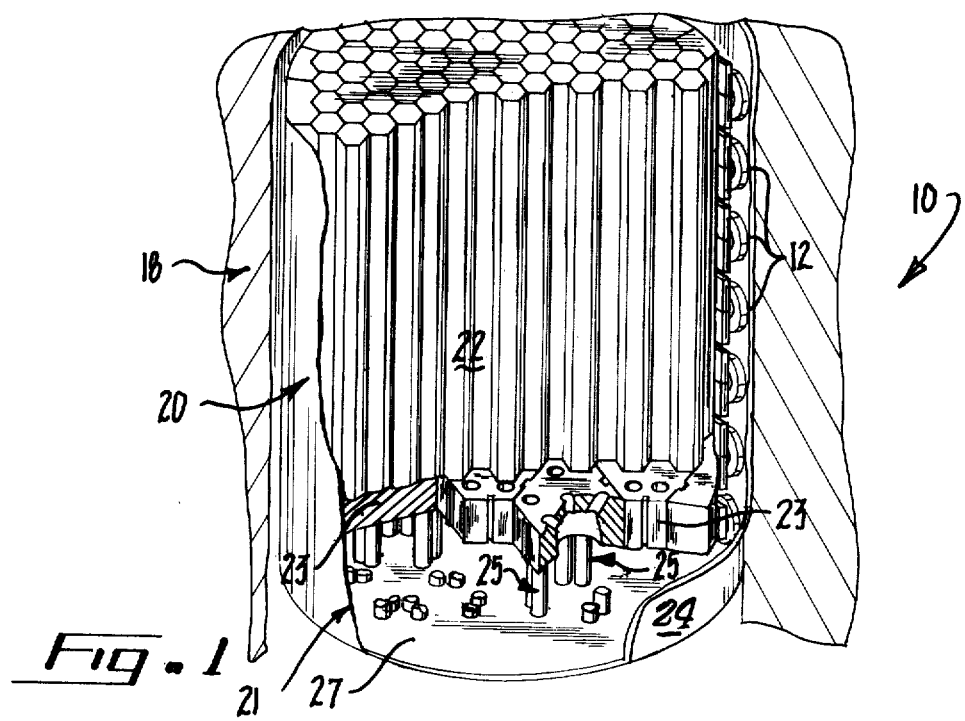
FIG. 1 is a sectioned side view in elevation of a nuclear reactor including a reactor core horizontally supported by a lateral restraint assembly within a shielded cavity formed by a reactor vessel.
Figure 2:
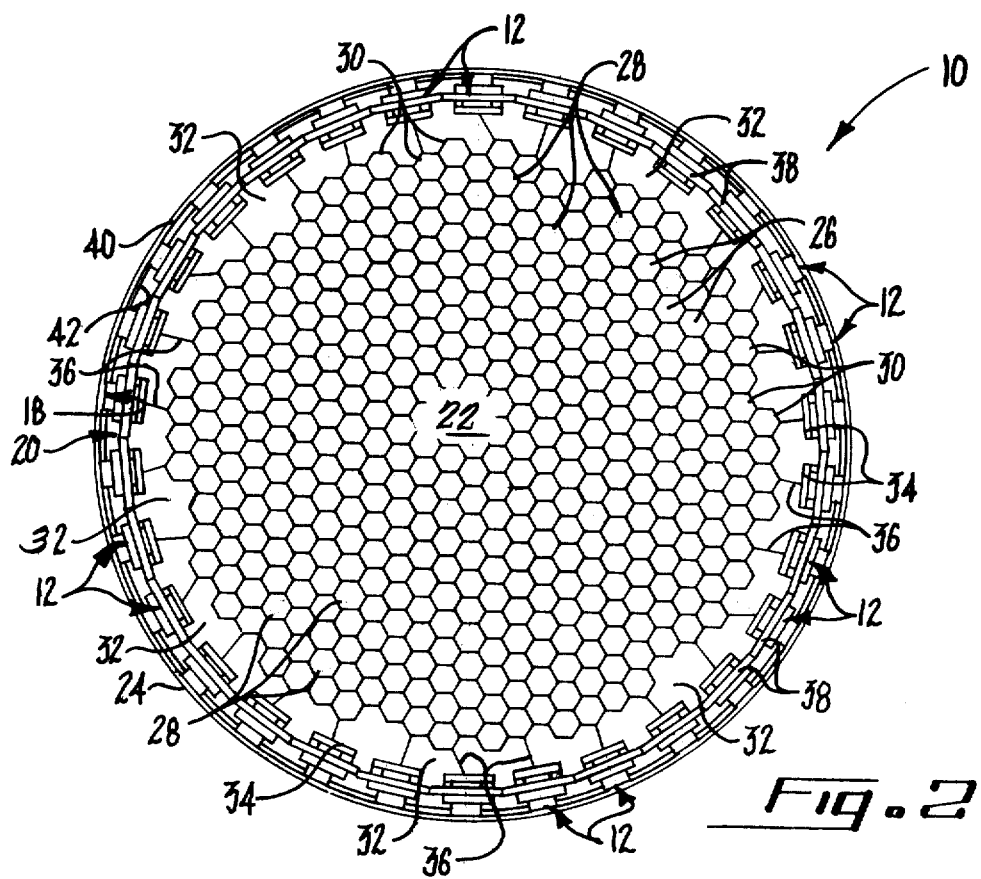
FIG. 2 is a top view further illustrating the mounting of the reactor core within the reactor vessel.

Referring now to the drawings, a nuclear reactor such as that indicated at 10 in FIGS. 1 and 2 forms a preferred environment for the spring pack of the present invention. One embodiment of the spring pack itself is best seen in FIGS. 3 and 4 (as indicated at 12) while another embodiment of the spring pack is indicated in 12' in FIG. 5. Each of the spring packs 12 and 12' includes a low-rate spring assembly 14 (14' in FIG. 5) and a high-rate spring assembly 16 (16' in FIG. 5). As will be made apparent in the following description, each of the spring packs is thus adapted to provide a bilinear spring rate while also permitting multi-directional relative movement for a sprung mass and an unsprung mass between which the spring pack is arranged.

Before proceeding with a more detailed description, it is initially noted that the reactor includes a hollow shell or vessel 18 forming a shielded cavity 20 within which a nuclear reactor core 22 is arranged. With such a reactor forming an environment for the spring pack of the present invention, a plurality of the spring packs 12 are arranged in spaced-apart relation between lateral surfaces of the reactor vessel 18 and the reactor core 22. Thus, the reactor vessel 18 may be considered as an unsprung mass with the reactor core 22 being considered as a sprung mass horizontally supported relative to the vessel 18 by the plurality of spring packs 12. It will be apparent from the following description that one or more of either of the spring packs 12 or 12' may be employed in many other applications where such a multiple or bilinear spring rate function is desirable.

As indicated above, the reactor 10 which is illustrated in FIGS. 1 and 2 provides only an exemplary environment for the spring pack of the present invention. In particular, the spring pack may be employed in any of a variety of different types of reactors where it is similarly necessary to provide cushioned support for a relatively massive reactor core. The reactor 10 is described briefly below only to permit a satisfactory understanding as to the manner in which the spring pack of the present invention performs therein.

The reactor 10 is preferably of a type wherein the reactor vessel is formed from prestressed concrete and has an internal liner 24 formed from steel. Only the liner portion of the reactor vessel is illustrated in FIG. 2 in order to permit a more detailed illustration of reactor components arranged therewithin.

Many other components of the reactor 10 are not illustrated within the present drawings since they do not relate directly to the spring pack of the present invention. However, it will be understood that the reactor 10 as illustrated in FIGS. 1 and 2 also includes other components which are normal to a high temperature gas-cooled reactor.

The reactor core 22 comprises a plurality of many nuclear fuel elements 26 arranged in hexagonal patterns respectively about a plurality of control fuel elements 28 each having holes for receiving control rods (not shown). The array of fuel elements is encircled by a plurality of replaceable mating reflector elements 30 and a single peripheral row of spaced reflector blocks 32.

Each adjacent pair of reflector blocks 32 defines a plurality of outwardly facing indentations 34 which are adapted to receive the spring packs 12 in a manner described in greater detail below with reference to FIGS. 3 and 4. The indentations are preferably formed along the junctures 36 between each adjacent pair of reflector blocks 32.

The fuel elements 26, reflector elements 30 and permanent reflector blocks 32 are stacked in columns, the individual elements being loosely held together by means of dowels so that the entire reactor core is free to expand or contract in a horizontal or radial direction.

The reactor core 22 is supported vertically at its base within the cavity 20 in a conventional fashion to permit relatively free lateral or radial movement of the core. The core is not restricted against vertical movement which may take place, for example, in response to thermal expansion and contraction or seismic effects. Otherwise, the configuration of the base support assembly for the reactor core 22 is not an important feature with respect to the present invention. Generally, the base support assembly is indicated at 21 in FIG. 1 and includes a mating assembly of support blocks 23 and support posts 25 arranged beneath the fuel elements 26, the reflector elements 30 and the reflector blocks 32. The support blocks 23 rest upon support posts 25 in the bottom head 27 of the prestressed concrete reactor vessel.

Due to the space limitations, it is particularly important to limit lateral movement of the reactor core 22 in any direction within the vessel 18. At the same time, it is also desirable to permit some vertical movement as well as tangential or angular movement of the core relative to the vessel 18. Such freedom of movement along three perpendicular axes is desirable during normal operation in order to accomplish a number of specific objectives. Initially, it is necessary to prevent disarrangement of the various elements making up the core as well as to prevent the development of load reactions within the core which might tend to cause structural failure, particularly of the various core components formed from graphite. In addition, it is also important to limit displacement of the core from a nominal or central position within the vessel.

Motion or stress of the type described immediately above generally tends to be of a relatively low magnitude. However, it is also necessary to design the lateral restraint assembly for the reactor core to also withstand or absorb motion or energy of a much greater magnitude such as may occur during seismic disturbances. At such times, it is particularly important to cushion or absorb movement of the core in order to maintain operating integrity within the core assembly.

The spring pack 12 is designed to provide cushioning for the reactor core under the wide variety of conditions discussed above. Initially, the spring pack permits multidirectional movement of the core within the vessel during normal operation when the core tends to experience movement under the influence of relatively low energy levels. However, the spring pack also is effective to cushion the core against movement caused by high energy levels such as seismic disturbances.

The construction and operation of the spring pack of the present invention is described below with particular reference to FIGS. 3-5. However, it may be seen with reference to FIGS. 1 and 2 that a large number of the spring packs may be arranged between the lateral surfaces of the reactor core 22 and the vessel liner 24 in order to provide more effective protection for the core.

Referring now particularly to FIG. 3, each of the spring packs 12 is arranged for interaction between the permanent reflector blocks 32 of the core 22 and the liner 24 of the reactor vessel 18. In order to conserve space, as was also noted above, each adjacent pair of permanent reflector blocks 32 forms an indentation 34 for receiving each of the spring packs 12. In order to further conserve space, a side shield 38 of otherwise conventional configuration is associated with each of the spring packs 12. Accordingly, a plurality of side shields 38 are arranged in closely spaced apart relation about the cavity 20 to provide proper shielding for the reactor core 22. Otherwise, the side shield 38 is not a portion of the basic spring pack as contemplated by the present invention. However, within the reactor 10 which is a preferred environment for the spring pack, each of the spring packs 12 does provide a mounting for one of the side shields 38.

It may also be most clearly seen from FIG. 3 that, in accordance with conventional practice, thermal insulation is arranged upon the inner surface of the liner 24 for the reactor vessel 18. The layer of thermal insulation is indicated at 40 in FIG. 3 as being confined between the reactor vessel liner 24 and steel cover plates 42. As will be made more apparent from the following description, each of the spring packs 12 includes an attachment fixture for direct interaction with the liner 24 which may be considered a structural element of the reactor vessel 18.

Having particular reference to FIGS. 3 and 4, each spring pack includes a face plate 44 arranged within one of the indentations 34 formed by a pair of permanent reflector blocks 32. The face plate 44 is urged into contact with the reflector blocks 32 by means of the spring pack which acts within compression. The face plate 44 is not secured to the permanent reactor blocks 32 in order to prevent the springs within the spring pack from acting or being loaded in tension.

The low rate spring assembly 14 referred to above comprises a plurality of helical coil springs 46 arranged in parallel relationship and each having one end connected to the face plate 44. The other end of each coil spring is connected to a cup-shaped spring container 48 which is nested within a similarly shaped spring housing 50.

Both the container 48 and housing 50 have annular flanges, indicated respectively at 52 and 54, for receiving a selective number of annular shims 56 therebetween. One or more of the shims 56 may be employed to adjust the overall dimension for the combined spring container and housing in order to properly locate the core 22 within the cavity 20. The shims 56 thus serve, for example, to accommodate construction tolerances within the reactor.

If such adjustment were not required within a particular application, the spring container 48 and spring housing 50 could of course be formed as a single integral element. The spring housing 50 also forms a mount for the side shield 38, as was discussed above. The spring housing 50 further serves as a structural member for transferring load forces from the reactor core to the high rate spring assembly 16. Accordingly, it may be desirable in certain applications to provide the housing with ribs, flanges or the like as a means of stiffening or providing greater structural integrity within the housing.

The outwardly extending end of the spring housing 50 is connected with the high-rate spring assembly 16 which preferably comprises one or more linear type springs such as the plate springs indicated at 58 and 60. The housing 50 is connected with a central portion of the first plate spring 58 while the peripheries of the two plate springs 58 and 60 are interconnected by means of an annular spring clamp 62. Similarly, a central portion of the other plate spring 60 is mounted directly upon the steel liner 24 by means of a cylindrical attachment fixture 64. As may be best seen in FIG. 3, the cylindrical fixture 64 is also preferably filled with thermal insulation as indicated at 66. The plate springs 58 and 60 are illustrated as being tapered. However, springs of constant thickness are satisfactory for many applications of the present spring pack.

In normal operation, multi-axial movement of the core 22 relative to the vessel 18, having a relatively low magnitude of energy, tends to be absorbed or resisted by the low-rate coil springs 46 alone. Such energy or motion tends to be absorbed by the coil springs for two reasons. Initially, the relatively low rate of the coil springs as compared to the plate springs 58 and 60 makes the coil springs more responsive to such initial movement. In addition, the plate springs 58 and 60 which form the high rate spring assembly 16 tend to resist or prevent any relative movement in a plane parallel to the plate springs themselves.

As indicated above, a mechanical means for limiting response of the low rate coil springs 46 is formed by the spring container 48. In particular, response of the coil springs 46 is limited when the face plate 44 enters into engagement with the flange 52 upon the spring container 48. Thereafter, motion of the reactor core 22 is transferred directly to the high rate plate springs 58 and 60 which provide a much higher level of resistance for rapidly cushioning and terminating further movement of the reactor core toward the liner 24. With a plurality of the spring packs 12 arranged in a manner illustrated in FIGS. 1 and 2, the low-rate and high-rate spring assemblies within each of the spring packs function in the manner described above to resist or limit movement of the core in any direction from its centered position illustrated in FIGS. 1 and 2.

Referring particularly to FIG. 3, it may be seen that the maximum amount of travel possible for the reactor core is established by the maximum amount of compression possible within both the low-rate spring assembly 14 and the high-rate spring assembly 16 for any one of the spring packs 12. As indicated above, maximum travel within the low-rate spring assembly 14 (see FIG. 3) is established by the normal spacing between the face plate 44 and the flange 52 for the spring container 48. Similarly, maximum travel for the high-rate spring assembly 16 is established by the spacing between central portions of the plate springs 58 and 60. These dimensions for the low-rate and high-rate spring assemblies may of course be varied to provide the most effective cushioning for the reactor core 22 or for any other sprung mass. The combined amount of travel or compression possible for both the low-rate and high-rate spring assemblies 14 and 16 is of course established by the permissible amount of radial travel allowed for the reactor core in any given direction.

An additional embodiment of a spring pack according to the present invention is illustrated at 12' in FIG. 5. Many components of the spring pack 12' in FIG. 5 are similar to those employed with the spring pack 12 of FIGS. 3 and 4. Accordingly, similar primed numerals are employed to identify those elements in FIG. 5 which correspond closely with similarly numbered elements in the spring pack 12 of FIGS. 2, 3 and 4.

Referring specifically to FIG. 5, it may be seen that the combined spring container 48 and housing 50 of FIGS. 3 and 4 have been replaced by a single cylindrical housing or limiting spacer 102 which functions in a similar manner in combination with the face plate 44', to limit the spring response of the low rate spring assembly 14'. The housing 102 provides a simpler configuration for the spring pack 12' since it does not include adjustment means of the type described above with reference to the spring packs 12 of FIGS. 3 and 4.

The high-rate spring assembly 16' also differs substantially from that illustrated in the spring pack 12 of FIGS. 3 and 4 in that only a single tapered plate spring 58' is employed. Accordingly, the cylindrical housing 102 is attached to a central portion of the plate spring 58' while the periphery of the plate spring 58' is directly connected with some freedom of rotational movement to the steel liner 24'. The connection between the plate spring 58' and liner 24' allows rotational movement therebetween in order to permit relatively free lateral flexure of the spring 58'.

The peripheral mounting for the plate spring 58' is provided by a plurality of circumferentially opposed beveled spacers 104 and 106 which are respectively arranged between the plate spring 58' and the steel cylinder 42' and between the plate spring 58' and the liner 24'.

Each pair of spacers 104 and 106 is held in place by a stud 108 which penetrates both spacers, a peripheral portion of the plate spring 58' and the steel cylinder 42'. The studs 108 are threaded to receive nuts 110. Thus, the plate spring 58' is held in spaced apart relation from both the liner 24' and the steel cylinder 42'.

It may accordingly be seen that the spring pack 12' of FIG. 5 functions in substantially the same manner as described above for the spring pack 12 of FIGS. 3 and 4. For example, the response of the low-rate spring assembly 14' is limited by the normal spacing between the space plate 44' and the adjacent annular edge of the cylindrical spring housing 102. The response of the high rate spring assembly 16' is limited by the spacing between a central portion of the tapered plate spring 58' and an adjacent portion of the liner 24'.

It will be obvious to those skilled in the art that various modifications of the present invention are possible in addition to those specifically shown within the attached drawings and described above. One particular example of such an additional modification may be in the relative arrangement of the low-rate spring assembly and the high-rate spring assembly for each of the spring packs 12 and 12'. Within the drawings, the low-rate spring assembly is illustrated adjacent the reactor core or sprung mass while the high rate spring assembly is arranged adjacent the reactor vessel or unsprung mass. Although such an arrangement is preferred, it would also be possible to reverse the positions of the two spring assemblies while permitting operation of the spring pack in substantially the same manner described above. Accordingly, the scope of the present invention is to be determined only from the following appended claims.

What is claimed is:

1. In a nuclear reactor including a vessel forming a shielded cavity with a reactor core being arranged within the cavity in generally spaced-apart relation from the vessel and vertically supported in a manner permitting at least limited movement of the core relative to the vessel along three perpendicular axes, a lateral restraint assembly comprising a plurality of spring packs arranged in spaced-apart relation from each other between lateral surfaces of the reactor core and the vessel, each of the spring packs including
at least one coil spring providing a relatively low-rate spring means and permitting multi-axial movement,
a relatively high-rate spring means,
means connecting the relatively low-rate coil spring with one of the core and vessel,
means connecting the relatively high-rate spring means with the other of the core and vessel,
means interconnecting the relatively low-rate coil spring with the relatively high-rate spring means, and
stop means limiting the spring response of the relatively low-rate coil spring so that initial multi-axial movement of the core relative to the vessel tends to be absorbed by the relatively low-rate coil spring while movement of the core relative to the vessel is resisted by the relatively high-rate spring means after the stop means limits response of the coil spring.

2. The nuclear reactor of claim 1 wherein the relatively low-rate coil spring is connected with a face plate arranged for interaction with the lateral surface of the reactor core, the stop means comprising a mechanical spacer means forming a portion of the means interconnecting the relatively low-rate coil spring with the relatively high-rate spring means, the mechanical spacer means being arranged for abutting engagement with the face plate to limit the spring response of the relatively low-rate coil spring, the mechanical spacer means thereafter providing a substantially rigid coupling between the face plate and the relatively high-rate spring means.

3. The nuclear reactor of claim 2 wherein the mechanical spacer means comprises a pair of nested cylindrical elements surrounding the coil spring and each having an annular flange, shim means being selectively inserted between the annular flanges for adjusting the overall length of the spring pack.

4. The nuclear reactor of claim 2 wherein the relatively high-rate spring means is connected with a structural portion of the vessel for the reactor.

5. The nuclear reactor of claim 1 wherein the relatively high-rate spring means comprises at least one linear-type spring.

6. The nuclear reactor of claim 5 wherein the high-rate spring means of each spring pack comprises a pair of linear-type springs interconnected with each other.

7. The nuclear reactor of claim 6 wherein the two linear-type springs are formed as plate springs interconnected with each other adjacent their peripheries, the interconnecting means for the relatively low-rate coil spring being secured to a central portion of one plate spring, the means connecting the high-rate spring means with the other of the core and vessel being a mounting fixture secured to a central portion of the other plate spring.

8. the nuclear reactor of claim 1 wherein the lateral surface of the reactor core is formed with an indentation for receiving each of the spring packs.

9. The nuclear reactor of claim 8 wherein the vessel for the reactor includes an inner structural liner element with thermal insulating material being disposed upon the inner surface of the liner element, a mounting fixture penetrating the insulating material for connection to the structural liner element to provide a rigid connection for each spring pack.

* * * * *